United States Patent Office 2,860,489
Patented Nov. 18, 1958

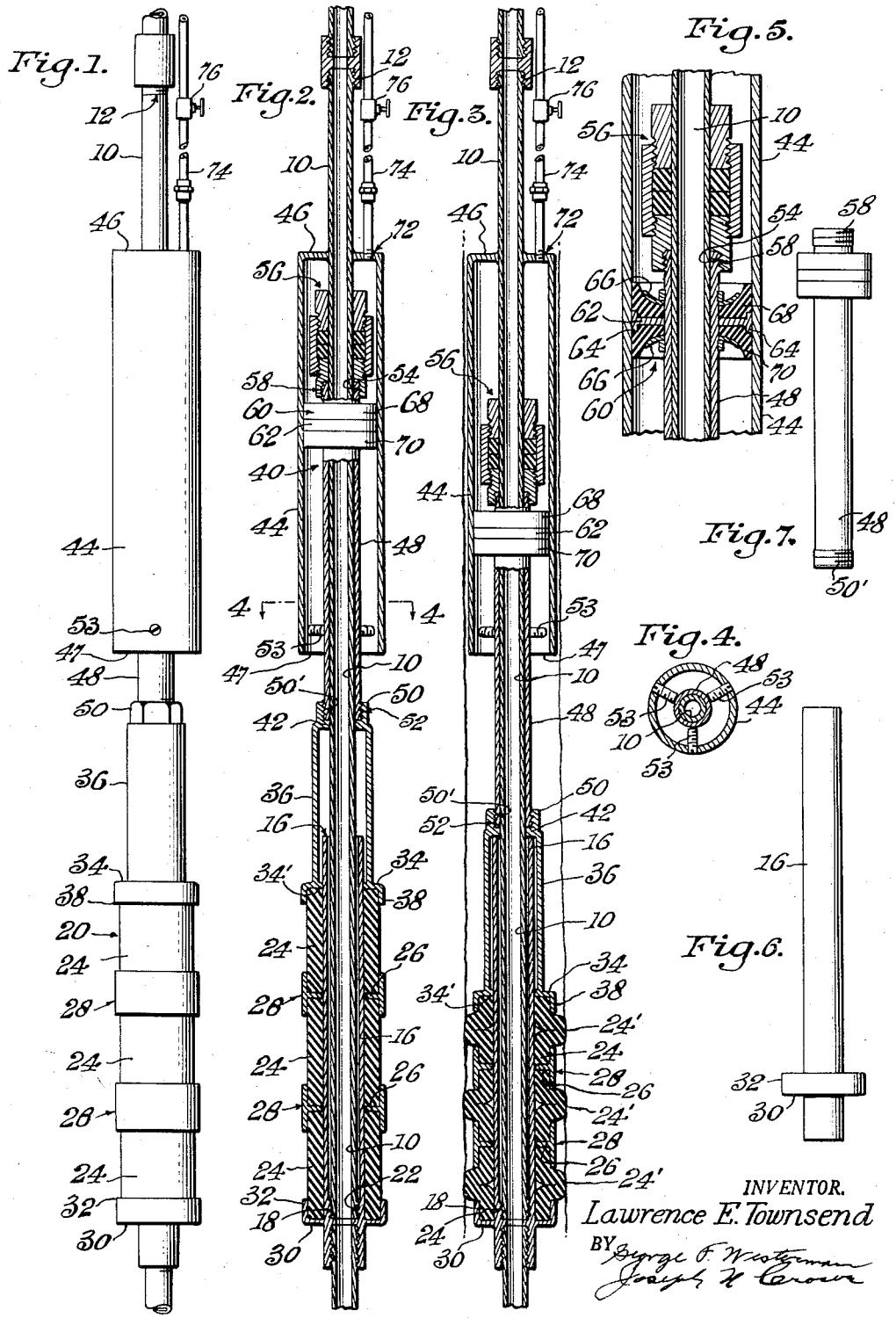

2,860,489

GROUTING OR SEALING APPARATUS

Lawrence E. Townsend, Riverdale, N. Dak.

Application September 18, 1953, Serial No. 381,150

7 Claims. (Cl. 61—63)

(Granted under Title 35, U. S. Code (1952), sec. 266)

The invention described herein may be manufactured and used by or for the Government for governmental purposes, without payment to me of any royalty thereon.

The present invention provides certain structural improvements in mechanical equipment which is designed to supply fluid-sealing or grouting compositions, such as fluid mixtures of cement and water intended to be used for filling and sealing open structural spaces or defects such as cracks, fissures, cavities, or the like that exist or are formed in certain types of constructions such as earthen or concrete dams, or embankments, or the like, which require filling or sealing before the construction can be considered to be complete. Such sealing material, customarily referred to as "grout," is retained in mechanical means suitable for application or injection of such grout into the spaces to be filled or sealed. The usual procedure is to place the grouting apparatus in a hole drilled in the structure to be grouted adjacent to and communicating with the space or aperture to be filled with the grout, and then to enlarge rubber sections of such apparatus to form a seal with the wall of the said hole. The grouting material (for example, a flowable cement-water mix) then is forced into the said hole under pressure through a central conduit in the grouting equipment and into the cracks or other spaces below the grouting apparatus.

Generally speaking, the present improved grouting apparatus provides structural and operational improvements over the conventional type of grouting equipment. Thus, the usual apparatus comprises a rubber cylinder which is expandible under pressure of a gas introduced therein. The present improved apparatus comprises a plurality of thick, soft rubber tubes which become bulbous when compressed by action of a piston which is operated by compressed air, such tubes when compressed forming an effective seal against the walls of the said hole.

An improved feature of the present construction is that compressed air is used for moving the aforesaid piston on the power stroke only. The compressed air cylinder is open at one end so the column pressure of water in the drill hole acts through the open end of the cylinder to return the piston to the top of the cylinder when the air line pressure is released. The form of the compressed rubber tubes assists in returning the piston to the top of the cylinder. Another feature of the present construction is a built-in stop which keeps the rubber tubes from becoming overcompressed regardless of how much air pressure is used on the piston.

It may be noted also that in sandy locations, drill holes may become enlarged due to the washing action of the drill and water. Conventional grouting equipment which are inflated with air and water, have a likelihood of overexpanding in an endeavor to fill this enlarged space, and as a consequence, are likely to blow out. In the present construction, the improved grouting apparatus cannot be overexpanded and cannot blow out if set in an enlarged section of a hole. In the case of the present improved apparatus, in the event that it does not hold in a drill hole, it may be partially released, moved up or down in the hole until stable walls are encountered, and then reset.

Additionally, the long rubber cylinder of the conventional grouting equipment cannot be deflated thoroughly because it sags to a bulb at the base, and for this reason it frequently tears on being forced past jagged edges occurring in coal seams or stony environments. On the other hand, the present improved apparatus returns completely to a uniform section and thus minimizes any tendency to hang up in an irregular section of a drilled hole.

The foregoing comparative discussion and differentiation between the conventional grouting apparatus and the improved equipment of the present invention indicates the principal objects of the present invention, which may be said to embrace also certain specific objects and advantages which will be referred to more particularly hereinafter.

One of such specific objects of this invention is to provide an apparatus of the above-indicated character which is equipped with a sealing unit that embodies a plurality of elastic members adapted to be compressed through the instrumentality of a compressor assembly into sealing relation with the wall of a previously drilled grouting hole.

Another specific object of this invention is to provide a sealing unit composed of a series of elastic sleeves arranged in end-to-end relation and adapted to be simultaneously folded and compressed into sealing contact with the wall of a grouting hole to prevent escape of the grouting material during the grouting operation.

A still further specific object of this invention is to provide a sealing unit composed of a series of elastic sleeves arranged in end-to-end relation behind a grout-discharge conduit, and adapted to be folded simultaneously and compressed into contact with the wall of a grouting hole by means of a reciprocatory compressor assembly actuated by a fluid operated power mechanism.

A still further object of this invention is to provide a grouting apparatus adapted to be inserted in a hole drilled for grouting purposes, the apparatus including a sealing unit embodying a series of elastic sleeves positioned in end-to-end relation and spaced from each other by separator rings constructed and arranged to prevent telescoping of the respective sleeves when they are subjected to the action of the compressor assembly.

Further objects and advantages of the present construction will become apparent as the description proceeds, and the features of novelty will be pointed out in particularity in the appended claims.

The present improved construction will be understood more readily by reference to the accompanying drawings, in which:

Fig. 1 is a side elevation of an apparatus embodying the improvements of the present invention;

Fig. 2 is a longitudinal section of the apparatus shown in Fig. 1;

Fig. 3 is a view similar to Fig. 2, but illustrating elastic sealing members of the sealing unit in folded and compressed position;

Fig. 4 is a transverse section taken on the line 4—4 of Fig. 2;

Fig. 5 is a fragmentary longitudinal section of actuating mechanism for the sealing unit or assembly showing structural details thereof;

Fig. 6 is a side elevation showing a stop and retainer ring construction; and

Fig. 7 is a side elevation of piston means employed for actuating the sealing unit, together with a portion of actuating means carried by the piston for actuating the sealing assembly.

Briefly stated, this invention embodies a grouting apparatus which is adapted particularly for packing or grouting uncased holes in soft formations such as sandy shales that have irregular walls in the drill hole resulting from any cause, such as by weathering action of the drilling fluid while the hole is being drilled, the improved apparatus of the present invention comprising a grouting conduit through which grouting material may pass from a source of supply to a grouting hole or space to be filled with such material, a fluid-actuated piston head and a tubular sectional piston rod assembly reciprocably slidably mounted on the grouting conduit, compressible sealing means embodying juxtapositioned elastic sealing sleeves retained in a section of the tubular piston stem and adapted to be extended and foldingly compressed into sealing relation with the wall of a drill hole to prevent escape of the grouting material during the grouting operation, the tubular piston stem or rod also including an operating section for the said sleeves for operating the said sealing sleeves between normal and sealing positions, the operating section including retaining means for holding the sleeves during operation thereof, and means for limiting the length of the reciprocatory movement of the piston and tubular sectional rod at both ends of the stroke, together with means for admitting actuating fluid, such as compressed air, to the piston head.

The features of the present construction will become apparent from a detailed consideration of the accompanying drawings, in which reference numeral 10 designates a grout-supplying conduit having opposite end portions externally threaded for connecting this conduit 10 to associated instrumentalities which will be referred to hereinafter. When in service, the conduit 10 will be disposed substantially vertically so that external threads 12 will be adjacent to the upper end of the conduit 10 and will serve to couple the conduit to a supply of grouting material which is to be supplied under pressure to the conduit 10 from a suitable supply, not shown, from which the conduit 10 supplies the material into an opening or recess to be sealed by such material.

An important feature of the present construction resides in the provision of a pair of cooperating assemblies mounted on and enclosing the lower portions of the conduit 10, one of which may be considered to be a stop assembly (shown in elevation in Fig. 6) and the other of which may be considered to be a sealing assembly or unit, which is shown in elevation in Fig. 1 and the operation of which is shown clearly in Figs. 2 and 3.

The stop assembly comprises an elongated tubular sleeve or pipe 16 which encloses the grouting conduit 10 and which is threaded internally as shown at 18, such threads 18 being adjacent to what is the lower end of the sleeve when in service, which threads are complemental to and are adapted to mesh with external threads 22 on the lower end portions of the conduit 10, it being evident that the diameter of the sleeve or pipe 16 is sufficient to enable the said sleeve to be slipped over the conduit 10 until the threads 22 of the conduit mesh with the threads 18 on the sleeve or pipe for threadingly connecting therewith. The sleeve or pipe 16 is provided with an integral cup-like flange 30 adjacent to its lower end, an upstanding rim 32 of this flange seating a resilient sleeve section 24 of the sealing assembly. There is provided a plurality of such sections 24 in end-to-end relation enclosing the sleeve or pipe 16 and retained by spaced retaining rings 28 from which extend inwardly annular flanges 26 which are disposed between adjacent ends of the elastic sealing sleeves or rings 24 and form retaining and anchoring seats for the elastic sleeves or sealing rings 24, the action of which will be set forth hereinafter in detail. As has been pointed out above, the series of elastic rings is retained at one end (that is, the lower end) of the assembly by the flange 30 and rim 32 thereof; whereas the opposite end of the assembly is retained by a cup-like flange 34 on an end of a tubular compressor housing 36, the flange 34 having an integral rim 38 similar to rim 32 of the aforesaid flange 30 but extending oppositely thereto and enclosing the opposite end of the series of elastic sealing rings 24, so that while the rim 32 of the flange 30 extends upwardly when the construction is in service, the rim 38 of the opposite flange 34 extends downwardly and is complemental to flange 30 and rim 32 in the manner of engaging and retaining the series of elastic sealing rings 24, the cooperating action of these flanges 30 and 34 being to compress the elastic sealing rings 24 between the retaining rings 28, thereby causing the rings 24 to be expanded as is indicated at 24' into sealing engagement with the side wall of a grouting hole while the apparatus is in operation.

In order to effect this sealing engagement, it is apparent that the tubular housing 36 is slidable along the above-mentioned tubular sleeve or pipe 16, this latter enclosing the grouting conduit 10 and being connected thereto adjacent to its lower end by inter-engagement of the threads 18 and 22 as aforesaid. This sleeve or pipe 16 terminates at its opposite end interiorly of this housing 36 and forms a bearing surface for reciprocatory movement of the housing 36 through provision of an inwardly directed flange 34' which is, in practice, a part of the above-mentioned retaining flange 34 and abuts against the end of the terminal sealing ring 24 of the series thereof and so cooperates with flange 34 and rim 38 to retain properly the end of the terminal sealing ring. This inner flange 34' engages the pipe 16 in all positions of the equipment.

It has been noted that this pipe 16 terminates in the aforesaid housing 36 which is adapted for reciprocatory movement on the sleeve or pipe 16, downward movement of the housing 36 along the sleeve 16 compressing the elastic sealing rings into sealing position 24' as has been noted above. This downward or sealing movement of the housing 36 is arrested by engagement of an inwardly extending flange 42 adjacent to the opposite end of the housing 36 with the end of the said tubular bearing sleeve or pipe 16 which is enclosed in the housing 36 as aforesaid. This housing 36 therefore may be defined as a compressor tube for reciprocally compressing the sealing rings 24 when the compressor tube is actuated in a sealing direction along the tubular bearing sleeve or pipe 16, and also enables expansion of these rings 24 when reciprocated in opposite or expanding direction.

For effecting actuation of this compressor tube, end 50 thereof is recessed and internally threaded as is indicated at 52 for connection with complemental external threads 50' on an end of a tubular actuating member or bar 48 which encloses and rides upon the grouting conduit 10 and which connects with an actuating piston assembly that is enclosed and operates within a cylinder 44, the head 46 of which is secured to the grouting conduit 10. The tubular bar 48 constitutes a part of a tubular piston rod which is completed by the cylindrical compressor housing or tube 36 which thus constitutes the actuating section of the tubular piston rod which is composed of the assembled or interconnected sections 36 and 48 which reciprocate on the grouting conduit 10 responsively to actuation of a piston head assembly mounted on the tubular section 48 and which operates responsively to admission of actuating fluid into the cylinder 44. The cylinder head 46 defines a stop for the upward stroke of the said piston, while the aforesaid engagement between the end of the bearing sleeve or pipe 16 with the end flange 42 of the tubular compression section 36 limits the compression stroke of the piston. The end 47 of the cylinder 44 opposite to the cylinder head 46 open, the open end portion of the cylinder being held rigidly relative to the grouting conduit 10 by a plurality of set screws 53 which are threadedly mounted in the cylinder 44. By providing cylinder 44 with an open end 47, the column pressure of water in the grout hole, assisted by the expansion of the sealing rings 24, functions to return the piston to its normal position as will hereinafter appear.

The tubular piston stem section 48 is extended through the piston head assembly and is threadedly received in a packing gland 56 which encloses the grouting conduit 10 as shown, and makes the piston structure fluid-tight with respect to the grouting conduit 10. The threaded connection between the piston stem section 48 and the packing gland 56 is indicated by external threads 54 on the end of the piston stem section 48 which intermesh with inner threads 58 in the adjacent end of the packing gland 56.

The piston head is an assembly designated generally at 60, which is mounted rigidly on the aforesaid stem or rod section 48 and is in fluid-tight engagement with the inner cylindrical wall of the cylinder 44. As is illustrated on the drawings, the piston head assembly 60 comprises an annular web 62 having a peripheral flange 64 which engages the inner wall of the cylinder 44 and extends in opposite directions from the web 62. The web 62 is mounted on the stem or rod section 48 intermediate retaining rings 66 which also are welded or otherwise mounted rigidly on the said section 48 and which coact with the web 62 and its peripheral flange 64 for retaining a pair of cup-shaped packing rings 68 and 70 which are composed of a suitable resilient fibrous or rubber material. These rings 68 and 70, in addition to being flexible and resilient, are provided with oppositely concaved surfaces so that either the air introduced into cylinder 44 under pressure through air intake pipe 74 or the water or a mixture of water and grouting material released from the grout hole entering the lower open end 47 of cylinder 44 under pressure will exert expansive forces on packing rings 68, 70 to expand these rings into fluid-tight engagement with the inner wall of the cylinder 44.

In the operation of the grouting apparatus, the grouting conduit 10 is operatively connected to a source of grouting material and the cylinder head is connected through the compressed air supply pipe 74 to a source of compressed air or a suitable hydraulic actuating fluid. The apparatus is then inserted within a grouting hole to a desired depth, and compressed air is admitted through the cylinder head into the cylinder 44 through inlet port 72 in which the pipe 74 is received. The compressed air acts upon the piston to drive the tubular piston stem 48 and compression section 36 thereof downwardly until the inner flange 42 of the compression section 36 engages the upper end of the guide and bearing sleeve 16. This downward movement of the compression section 36 of the piston stem extends the sleeves 24 outwardly and folds them into the plurality of annular folds 24' projecting between the retaining rings 28, Fig. 3, these folds 24' being compressed into sealing contact with the wall of the grouting hole. Grouting material is then introduced under pressure through the grouting conduit 10 to the grouting hole. After completing the grouting process, the air pressure in the cylinder is released by opening pressure release valve 76 in the pipe 74, and the pressure of the system below the piston coacting with the inherent resiliency of the deformed elastic sleeves, returns the piston to its normal position and the apparatus is removed from the grouting hole.

Having thus described my invention, what I claim as new and wish to secure by Letters Patent is:

1. A grouting apparatus comprising, in combination, a grouting conduit having a lower end and an upper end, a sealing assembly mounted on the conduit and including a rigidly mounted cup-shaped retaining member immovably carried by the said conduit adjacent to the lower end thereof, a plurality of elastic sealing rings carried by the cup-shaped retaining member, and spaced retaining and separating means movable with the sealing rings for retaining the sleeves in separated end-to-end relation and spaced one from another by the separating means, a piston assembly including a reciprocable piston head, a tubular piston stem connected thereto, and compression means for the sealing rings mounted on the said piston stem, the piston assembly enclosing the said conduit and reciprocally movable thereon, an actuating cylinder enclosing the piston head, and means separate from the grouting conduit for introducting actuating fluid into the cylinder for actuating the piston in the cylinder, outward movement of the piston head relative to the cylinder actuating the piston stem to force the compression means against the said elastic sleeves for deforming the latter into a plurality of sealing nodes extending outwardly between the said retaining and separating means and into fluid-sealing engagement with side portions of a hole receiving the grouting conduit.

2. Sealing or grouting apparatus which comprises, in combination, a cylinder having a closed end and an open end and adapted to be received into a grouting hole, a delivery conduit extending through the cylinder and being in fluid-tight relation with the closed end of the cylinder, the said conduit delivering grouting material from a supply thereof through the grouting hole into a space to be sealed by the grouting material, a bearing sleeve secured rigidly adjacent to one end to the conduit and having a free opposite end, a cup-shaped retaining flange on the bearing sleeve adjacent to the secured end thereof, resilient elastic sealing means seated in the said retaining flange and enclosing the said sleeve, securing means slidably mounted on the bearing sleeve for the sealing means engaging the said sealing means and retaining the latter in engagement with the sleeve, a fluid-actuated piston in the cylinder slidably mounted on the conduit for reciprocatory movement thereon, the said piston including a piston head and a tubular piston rod connected to the piston head and enclosing the conduit for a substantial length thereof in sliding engagement therewith and terminating in an enlarged housing enclosing the free end of the bearing sleeve, the housing having a closed end and an opposite open end, the closed end being engageable by the free end of the bearing sleeve for stopping outward movement of the piston relative to the cylinder, a cup-shaped flange on the housing adjacent to the open end thereof and engaging the elastic sealing means oppositely to the cup-shaped flange on the bearing sleeve for compressing the sealing means between the cup-shaped flanges responsively to actuation of the piston outwardly relative to the cylinder and expanding the sealing means into fluid-tight sealing engagement with side portions of the grouting hole, means entering the closed end of the cylinder for introducing actuating fluid for the piston intermediate the closed end of the cylinder and the piston head, and means for releasing the said pressure, whereupon inherently-acting elasticity of the sealing means enables retraction thereof from the wall portions of the grouting hole and also elongation of the sealing means against the cup-shaped flanges for effecting separating movement therebetween with retraction of the piston in the cylinder, the said retraction being expedited by entry of material under pressure from the grouting hole into the cylinder through the open end thereof.

3. Sealing or grouting apparatus which comprises, in combination, a pressure cylinder adapted to be received into a grouting hole, the cylinder having a closed end and an open end, a delivery conduit extending through the cylinder for delivering grouting material from a supply thereof through the grouting hole into a space to be sealed by the grouting material, a fluid-actuated piston in the cylinder and slidably mounted on the conduit for reciprocatory movement thereon, the piston including an actuating piston head and a tubular piston rod connected to the head and enclosing the conduit for a substantial length thereof, a bearing sleeve also enclosing the conduit and secured rigidly thereto while having a free end spaced from the piston rod but engageable thereby to form a stop for outward movement of the piston relative to the cylinder, a cup-like retaining flange on the bearing sleeve remote from the free end thereof, resilient elastic sealing means seated in the retaining flange and enclosing the bearing sleeve, the said piston rod terminating in a housing portion enclosing the free end of the bearing sleeve and having a closed end and an opposite open end, a cup-like flange on the housing portion engaging the sealing means oppositely to the cup-like flange on the bearing sleeve, inwardly extending guide elements in the housing portion in sliding engagement with the bearing sleeve, the said flange on the housing portion compressing the sealing means against the flange on the bearing sleeve during outward movement of the piston relative to the cylinder and causing expansion of the sealing means into sealing engagement with side portions of the grouting hole, means for introducing actuating fluid for the piston under pressure intermediate the piston head and the closed end of the cylinder, thereby forcing the piston head outwardly relative to the cylinder and causing the housing portion of the piston rod to expand the sealing means as aforesaid, and means for releasing the pressure in the cylinder, thereby enabling the compressed and expanded sealing means to return to normal elongated position with accompanying retraction of the piston head into the cylinder, the said sealing means comprising a plurality of elastic sleeve members disposed in end-to-end relation and enclosing the bearing sleeve, lateral retaining means engaging contiguous elastic sleeve members and retaining them in place relative to the bearing sleeve, and separating flange means loosely mounted on the bearing sleeve intermediate contiguous sleeve members for separating adjacent ends thereof and maintaining the sleeve members as separate sectional sleeve elements for the bearing sleeve.

4. Grouting or sealing apparatus adapted particularly for packing or grouting uncased drill holes in soft formations such as sandy shales having irregular walls in the holes, which apparatus comprises a grouting conduit through which grouting material may pass into the hole below the apparatus from a supply of grouting material, a fluid-receiving housing rigidly mounted on the conduit enclosing upper portions thereof, a fluid-actuated piston in the housing including a piston head in the housing reciprocably mounted on the grouting conduit and a tubular piston stem or rod extending from the piston head and through an end of the housing exteriorly thereof, the piston head and rod enclosing portions of the said conduit and reciprocably slidably mounted thereon, the said conduit defining a supporting guide for the piston and rod during reciprocations thereof, the said tubular piston rod having a free end extended into an enlarged tubular compressor housing having a closed upper end, an open bottom end, a stationary sleeve rigidly mounted on the grouting conduit and having its upper end continuously projecting into the compressor housing, an upwardly-directed stationary cup-like retaining flange fixedly mounted on the sleeve adjacent to its lower end, a complemental downwardly directed cup-like retaining flange on the compressor housing, resilient compressible sealing means enclosing the sleeve intermediate the retaining flanges and comprising a series of juxtaposed individual sealing members, the series of sealing members being engaged endways by the stationary cup-like retaining flange and the complemental retaining flange and retained on the sleeve between the said flanges, the said flanges coacting against the series of sealing members for compressionally expanding the sealing members into sealing engagement against the walls of the hole responsively to compressional strokes of the piston and piston rod, the said sealing members being peripherally self-deforming in conformity to irregularities in the walls of the hole, anchoring means slidably mounted on the sleeve for the sealing members intermediate adjacent individual sealing members of the series thereof, each of the anchoring means including a web portion normal to the sleeve and engaging each successive sealing member and oppositely extending flange portions overlyingly engaging both adjacent sealing members, adjacent flange portions of successive anchoring means being spaced apart sufficiently to enable the successive sealing members to expand under compression exerted thereon by the complemental retaining flanges responsively to the compressional strokes of the piston and piston rod and to be foldingly compressed against the walls of the hole into sealing engagement therewith for preventing escape of grouting material from the hole, the said anchoring means also restraining telescoping of respective sealing members during compression thereof, the said sealing members returning to normal retracted position responsively to retraction of the piston and piston rod to starting position and attendant release of compression on the sealing members, and means separate from the grouting conduit for admitting actuating fluid for the piston into the fluid-receiving housing.

5. Grouting or sealing apparatus adapted particularly for packing or grouting uncased drill holes in soft formations such as sandy shales having irregular walls in the holes, which apparatus comprises a grouting conduit through which grouting material may pass into the hole from a supply thereof, a piston housing rigidly mounted on the grouting conduit, a fluid-actuated piston in the housing including a piston head and a tubular piston rod extending from the piston head and projecting through an end of the housing exteriorly thereof, the piston and its rod being reciprocably slidable along the grouting conduit and enclosing the conduit for guidance thereby, means separate from the grouting conduit for admitting piston-actuating fluid into the piston housing, a stationary sleeve element rigidly mounted on the grouting conduit and spaced from the piston housing, compressible resilient sealing means mounted on the stationary sleeve element and embodying a series of juxtaposed individual elastic sealing rings enclosing the stationary sleeve element, oppositely directed compressional retaining means for the series of rings engaging the said series endways thereof and including a pair of oppositely directed complemental cup-like retaining means, one of the retaining means being stationary, the other being movable responsively to movements of the piston rod and compressing the rings between the retaining means responsively to compressional strokes of the piston rod, anchoring means slidably mounted on the stationary sleeve element for retaining the sealing rings in juxtaposed adjacent relation, the anchoring means including a web portion vertically disposed to the sleeve element intermediate successive sealing rings in engagement with each successive sealing ring and oppositely extending flange portions overlying both adjacent rings, the flange portions of successive anchoring means being spaced apart sufficiently for enabling the sealing rings to expand circumferentially against the sides of a drill hole under compression exerted thereon between the cup-like retaining means responsively to compression strokes of the piston and piston rod and to become foldingly compressed against the sides of the drill hole and in conformity with any irregularities therein for preventing escape of grouting material from the drill hole, the anchoring means also preventing telescoping of respective sealing rings during compression thereof, the said sealing rings returning to normal retracted position responsively to retraction of the piston to starting position, and stop means for limiting the length of reciprocatory movement of the piston at both ends of each stroke thereof.

6. A grouting apparatus including a conduit for grouting material and a sealing means rigidly mounted on the conduit, said sealing means comprising a sleeve member rigidly secured to the conduit, said sleeve member having a first end and a second end, a retaining flange member rigidly mounted adjacent to the first end of the sleeve member, a compression member having a first end, a second end and an intermediate body portion, a retaining flange member rigidly secured to the first end of the compression member, the first end and intermediate body portion of the compression member being adapted to move reciprocally over the sleeve member, the second end of the compression member fitting the conduit closely and coacting with the second end of the sleeve member to provide a stop for the compressing movement of the compression member, a series of elastic sealing rings loosely mounted on said sleeve member intermediate the retaining flanges of the sleeve and compression members, outer ends of terminal sealing rings being confined to the sleeve member by the retaining flanges of the sleeve and compression members, a retaining separator slidably mounted on the sleeve member intermediate facing surfaces of adjacent sealing rings, the said retaining separator having flanges confining portions of said sealing rings in contact with the sleeve member, actuating means for the compression member, and means independent of the conduit for operating the actuating means for moving the compression member against a terminal elastic ring for sequentially compressing the elastic rings into a plurality of sealing nodes projecting outwardly between the flanges of successive retaining separators for the rings.

7. Grouting apparatus comprising a conduit having an upper end and a lower end, sleeve means rigidly mounted on the conduit and including a retaining flange rigidly mounted on the lower end of the sleeve means, a series of juxtapositioned elastic sealing rings mounted on the sleeve means and enclosing the said sleeve means while being supported thereon by the retaining flange, a plurality of spaced retaining anchoring means for the said sealing rings including a web extending outwardly from the sleeve means and retaining flanges extending oppositely from the web in overlying engagement with adjacent elastic sealing rings, said anchoring means being loosely mounted on the sleeve means intermediate adjacent elastic sealing means, compression means for the said sealing rings slidably mounted upon the conduit and enclosing an end of the sleeve, said compression means being in engagement with a terminal elastic sealing ring, actuating means for the compression means, and means independent of the conduit for operating the actuating means for moving the compression means against a terminal elastic sealing ring for sequentially compressing the elastic sealing rings into a plurality of sealing nodes projecting outwardly between successive anchoring means for the sealing rings.

References Cited in the file of this patent

UNITED STATES PATENTS

| | | |
|---|---|---|
| 1,662,336 | Reynolds | Mar. 13, 1928 |
| 1,850,218 | Thomas | May 22, 1932 |
| 1,956,694 | Parrish | May 1, 1934 |
| 2,313,109 | Wertz | Mar. 9, 1943 |
| 2,671,512 | Ragan et al. | Mar. 9, 1954 |
| 2,694,453 | Longeval et al. | Nov. 16, 1954 |
| 2,715,444 | Jewell | Aug. 16, 1955 |